United States Patent
Nair et al.

(10) Patent No.: US 6,391,372 B1
(45) Date of Patent: May 21, 2002

(54) STABILIZED ANNATTO-CARAMEL FOOD COLORANT FOR RTE CEREAL

(75) Inventors: Malathy Nair, Louis Park; James W. Geoffrion, Anoka; Mark A. Kooyman, Maple Grove, all of MN (US)

(73) Assignee: General Mills, Inc., Minneapolis, MN (US)

( * ) Notice: Subject to any disclaimer, the term of this patent is extended or adjusted under 35 U.S.C. 154(b) by 39 days.

(21) Appl. No.: 09/697,172

(22) Filed: Oct. 27, 2000

Related U.S. Application Data

(63) Continuation of application No. 08/937,297, filed on Sep. 27, 1997.

(51) Int. Cl.[7] ............................................. A23L 1/164
(52) U.S. Cl. ........................ 426/620; 426/621; 426/262; 426/293; 426/302
(58) Field of Search ............................. 426/458, 302, 426/262, 293, 620, 621

(56) References Cited

U.S. PATENT DOCUMENTS

| | | | |
|---|---|---|---|
| 43,034 A | 6/1864 | Macphail | |
| 2,402,999 A | 7/1946 | Heyman | |
| 2,784,118 A | 3/1957 | Pyle et al. | |
| 2,793,124 A | 5/1957 | Buzas et al. | |
| 2,831,775 A | 4/1958 | Kocher | |
| 2,841,499 A | 7/1958 | Grossi | |
| 2,861,891 A | 11/1958 | Bauernfeind et al. | |
| 3,214,294 A | 10/1965 | Meisel | |
| 3,618,588 A | 11/1971 | Anwar et al. | |
| 3,644,122 A | 2/1972 | Yeransian | |
| 3,658,557 A | 4/1972 | Samejima et al. | |
| 4,138,271 A | 2/1979 | Ohira et al. | |
| 4,204,043 A | 5/1980 | Schultz | |
| 4,225,432 A | 9/1980 | Booth et al. | |
| 4,304,792 A | 12/1981 | Sreenivasan et al. | |
| 4,325,743 A | 4/1982 | Tibbetts et al. | |
| 4,335,153 A | 6/1982 | Rikon et al. | |
| 4,416,700 A | 11/1983 | Clark et al. | |
| 4,548,822 A | 10/1985 | Schmidt | |
| 4,699,664 A | 10/1987 | Hittiarachchy et al. | |
| 5,053,240 A | 10/1991 | Todd, Jr. | |
| 5,079,016 A | 1/1992 | Todd, Jr. | |
| 5,114,492 A | 5/1992 | Wolf et al. | |
| 5,223,298 A | 6/1993 | Wullschleger et al. | |
| 5,258,189 A | * 11/1993 | Efstathiou | 426/73 |
| 5,382,443 A | * 1/1995 | Kincaid et al. | 426/620 |
| 5,484,617 A | 1/1996 | Tiffany | |
| 5,633,031 A | 5/1997 | Sablocki et al. | |

FOREIGN PATENT DOCUMENTS

| | | |
|---|---|---|
| GB | 2 188 823 A | 10/1987 |
| WO | WO 94/13743 | 6/1994 |

OTHER PUBLICATIONS

Patey et al., "Ammonia Caramels: Specifications and Analysis", Food Additives and Contaminants, vol. 2, No. 2, pp. 107–112, Jun. 1985.

Arena, "Esame Merceologico Dei Caramelli", Industrie delle Bevande, Anno 13 No. 14, pp. 297–301, Aug. 1984.

Thornton, "Caramel Colours—A Brief Review", Food Science and Technology Today, vol. 4, No. 1, p. 9–11, Mar., 1990.

Wood, "Caramel Colorurs Under Review", Nutrition Bulletin, vol. 7, No. 1, pp. 27–30, Nov. 1982.

* cited by examiner

*Primary Examiner*—Nina Bhat
(74) *Attorney, Agent, or Firm*—John A. O'Toole; Douglas J. Taylor; Everett G. Diederiks, Jr.

(57) ABSTRACT

Annatto-caramel food colorant blends having a pH of about 9.1 to 10 that exhibit improved stability against precipitation and provide a rich brown color are particularly useful for use in RTE cereals. The blends are characterized by low ammonia contents (<0.05%). Methods for preparing low ammonia content caramel color solutions involve adding KOH to a caramel solution to a pH of >10, off gassing ammonia to reduce the ammonia content to <0.05%, and acidifying the caramel colorant to a pH of 6.5 to 7 to provide a treated low ammonia neutral aqueous caramel colorant. An aqueous annatto colorant having a pH of about 12.5 to 13.5 is admixed with the treated low ammonia neutral caramel solution in a solids weight ratio of about 1:1 to about 4:1.

8 Claims, No Drawings

STABILIZED ANNATTO-CARAMEL FOOD COLORANT FOR RTE CEREAL

This application represents a continuation of U.S. application Ser. No. 08/937,297, filed on Sep. 27, 1997, pending.

FIELD OF THE INVENTION

The present invention relates to food products, their method of preparation and methods for their use. More particularly, the present invention relates to an all natural food colorant for food products comprising both annatto and caramel, methods of preparing such colorants and methods of use of such colorants.

BACKGROUND

The present invention provides an improvement in providing rich brown aqueous colors for foodstuffs having reddish hues. A richer brown color is a very desirable color for foodstuffs because such colors are particularly appealing for grain based foods.

While certain synthetic approved chemical colorants are permitted for use in food products, it would be desirable to have an "all natural" food colorant.

Annatto is one of the most widely used of natural food colorants and provides a yellow orange hue. The coloring matter of annatto consists of carotenoid pigments found on the surface of seeds of the bixa orellana tree which is widely found throughout the tropics. Bixin is the major component of annatto color, comprising more than 80% of the pigment in the seed coating but other pigments have also been identified including cis-norbixin, trans-norbixin and others.

Bixin is completely soluble in fats and oils up to 0.1% by weight while norbixin has a much lower solubility in oil but good solubility in aqueous solution as the corresponding sodium or potassium salt. As a result, for coloring fat or oil foods, annatto comprising high quantities of bixin is employed. However, for aqueous based annatto, the solution is typically provided at an alkaline pH above 13 and comprises substantial amounts of the norbixin.

While annatto color alone is popular for use in many food products, it would be desirable to provide a rich brown with a red hue or a brown with yellow tint colorant especially for cereal based foodstuffs such as RTE cereals. To provide a rich brown colorant employing annatto as the base color constituent, it is necessary to add a second natural colorant to modify the annatto color to add a brown hue.

Caramel is a brown natural colorant. Caramel coloring is defined as the "amorphous, dark brown material resulting from the carefully controlled heat treatment of food grade carbohydrates." Food grade acids, alkalis, and salts may be employed to assist caramelization. Detailed information on caramel coloring can be found in the color additives regulations promulgated under the Federal Food, Drug and Cosmetic Act, published in Part 8, Title 21 of the Code of Federal Regulations. Caramel coloring is generally provided as an aqueous solution having a highly acidic pH of about 3.

When substantially similar amounts of the acidic caramel color is admixed with the highly alkaline annatto color to provide a golden brown water based colorant, the resultant aqueous mixture typically has a pH of about 6.6 to 6.9. However, over time, this blend tends to result in annatto precipitation.

Recently, cooked cereal based food products such as RTE cereals and snack products have been provided characterized by line features having a high degree of line resolution (see, for example, U.S. Pat. No 5,639,485, issued Jun. 17, 1997 to Weinstein et al). Such line color cereal products are prepared by coextruding a cooked cereal dough with minute quantities of a water-based colorant through a die insert to form a dough flow having in cross section a complex pattern. The die insert has a plurality of minute diameter discharge ports for the aqueous colorant solution. The dough having the complex color pattern is then necked down through a small acutely angled passageway to maintain the complex pattern even though the cross sectional diameter of the dough is reduced. The dough is then extruded such as under direct expansion conditions and sectioned into individual pieces to form, for example, puffed individual pieces exhibiting a complex pattern. The pieces are suitable for use as puffed RTE cereals or cereal based snacks (see, for example, U.S. Pat. No. D 368,791 issued Aug. 8, 1996 to Laughlin entitled "Food Product" which discloses a design reminiscent of a basketball).

When the annatto-caramel aqueous blend is used to provide coloring for RTE cereals (see for example U.S. Ser. No. 08/241,321, filed May 11, 1994) in apparatus having very small colorant discharge ports, the annatto precipitate can lead to die plugging or fouling, and inconsistent product quality in terms of consistency of coloration. Cleaning the die can result in substantial loss of production on the order of about 20 to 30% of production capacity. These problems are aggravated when the annatto-caramel golden brown colorant has been preblended, e.g., by a color supplier and stored for extended periods prior to use as is common in the commercial manufacture of foodstuffs such as RTE cereals typically consumed with cold milk or snacks.

To reduce the problem of fouling, one approach is simply to dilute the annatto-caramel colorant blend with water and use more of the dilute aqueous colorant. While helpful in reducing the severity of the plugging problem, the fouling problem continues to require frequent cleaning of fouled dies.

In another approach, the annatto-caramel blend can be formulated with so-called acid stable annatto. An acid stable annatto includes gelatin and emulsifiers to suspend the annatto precipitate that is formed. Acid stable annatto is used widely, especially in the dairy industry for cheese coloring.

Use of acid stable annatto can advantageously reduce the severity of the plugging problem even more than dilution. Unfortunately, using acid stable annatto has two serious disadvantages. One significant disadvantage is the higher cost of acid stable annatto. More significantly, however, using acid stable annatto creates problems in the production of RTE cereals. Using acid stable annatto in an annatto-caramel color blend in the extruder as described above for RTE cereal or snack shaped product production causes a sputtering effect on the cooked cereal dough extrudate. This sputtering effect can result in undesirable deformation of the desired shaped product. Also, the sputtering can result in the colorant becoming air borne resulting in staining both equipment and operating personnel. Moreover, the shaped pieces exhibit a tendency to both deform and to stick to one another. These operational problems render the use of acid stable annatto impractical irrespective of the cost penalty of using acid stable annatto.

In view of the difficulties in providing annatto-caramel colorant, there is a continuing need for new and improved annatto based colorants that can be used in the commercial manufacture of foodstuffs, especially cereal based foods such as RTE cereals and snacks.

There is further need for annatto-caramel colorants that do not require the use of gelatin.

Still another objective is to provide colorants that are "all-natural."

Another objective is to provide a brown colorant for an RTE cereal that does not bleed into the milk.

Still another objective is to provide a low cost annatto-caramel colorant.

Surprisingly, the above problems can be overcome, the above objectives obtained and improved annatto-caramel colorants provided, that when used in the commercial manufacture of RTE cereals and snacks, greatly minimize the severity of die fouling. Moreover, employment of the novel improved annatto-caramel colorants herein minimize problems of sputtering that can result in product deformation and clumping.

The improved annatto-caramel aqueous colorants importantly are characterized by a specific alkaline pH range obtained such as by addition of potassium hydroxide. Also, the colorants are degassed of evolved ammonia gas to provide an aqueous colorant having an ammonia content of less than 0.05%. The annatto-caramel colorant can be pre-blended and exhibit up to three months shelf life when stored at refrigerated conditions.

SUMMARY OF THE INVENTION

In one product aspect, the present invention resides in an annatto-caramel colorant blend exhibiting improved stability against precipitation. The annatto-caramel colorant comprises:

A. a first colorant comprising an aqueous solution of water soluble annatto having a pH ranging from about 12.5 to 13.5 and a total solids content of about 14 to 18%, B. a second colorant comprising an aqueous caramel solution having a solids content of about 35 to 55%, a pH of about 6.5 to 6.9, and an ammonia content of less than 0.05%, wherein the volume ratio to first colorant to second colorant ranges from about one part of first colorant to one part second colorant to about four parts first colorant to second colorant (1–4:1), wherein the annatto-caramel colorant blend has a pH of from about 9.1 to 10.

The present invention further provides a reduced ammonia content, "neutral" pH treated aqueous caramel color solution useful as an intermediate or color constituent of the present annatto-caramel colorants herein.

In one process aspect, the present invention resides in methods for preparing the present intermediate treated caramel color solutions. The method for preparing the treated caramel colorant includes the steps of:

A. providing an aqueous caramel colorant having a dissolved ammonia content greater than about 0.05% and a pH of less than 7;

B. adding a potassium hydroxide solution in amounts sufficient to raise the pH to above 10 to provide an alkaline caramel colorant;

C. maintaining the alkaline caramel colorant at a pH of at least 10 to release ammonia gas for sufficient times to provide a reduced ammonia caramel color solution having an ammonia content of less than 0.05%;

D. acidifying the reduced ammonia caramel color solution to a pH ranging from about 6.7 to 7.0 to provide a neutral low ammonia caramel color solution.

In its method of preparing a finished annatto-caramel colorant, the methods additionally include the steps of:

E. providing an aqueous annatto colorant having a solids content of at least 14% and a pH of at least 13;

F. admixing the aqueous annatto colorant with the reduced ammonia caramel colorant in a weight/volume ratio of annatto colorant to caramel color solution of about 1–4:1, to form an annatto-caramel colorant blend;

G. adjusting the pH of the annatto-caramel colorant blend to a pH ranging from about 9.3 to 10.0.

DETAILED DESCRIPTION OF THE INVENTION

Throughout the specification and claims percentages are by weight and temperatures in degrees Fahrenheit unless otherwise indicated.

The first essential component of the present coloring compositions is an aqueous annatto colorant. Aqueous annatto colorants are staples of commerce and the skilled artisan will have no difficulties identifying sources of supply for such materials. Aqueous annatto colorant solutions are obtained by extracting annatto seed with aqueous potassium hydroxide solution to saponify the coloring material and make it water soluble.

Generally, such aqueous annatto solutions comprise an annatto colorant, typically primarily norbixin, comprising about 12 to 20% total solids, preferably about 15 to 17% solids. The aqueous annatto is highly alkaline, typically exhibiting a pH of about 12.5 to 14, typically about 13.

Useful herein, for example, is an aqueous annatto colorant solution available from Rhone-Poulenc.

A second essential component of the present invention is a low ammonia, neutral pH aqueous caramel colorant prepared according to the present invention. After processing as described herein, the treated caramel solution has an ammonia content of less than 0.05%, preferably less than 0.03%, and most preferably <0.02%. The treated aqueous caramel colorant is also characterized as being "neutral," i.e., as having a pH of about 6.5 to 7.0. Typically, the total solids content will be on the order of about 35 to 55% solids. The solids include reaction products typically found in the caramel colorant. The starting caramel solution is in the preferred form, prepared by heating dextrose in the presence of a catalyst which is added to increase the final caramel solution's color rate and color strength.

The present annatto-caramel colorant blends comprise an admixture of the aqueous annatto colorant and the treated alkaline low ammonia caramel colorant. The particular ratios of first annatto colorant to second caramel colorant depends primarily upon the particular hue desired to be provided by the finished colorant. However, good results are obtained when the weight ratio of annatto to caramel ranges from about one part annatto to one part caramel to about four parts annatto to one part caramel, preferably about two parts annatto to one part caramel. Preferably, the weight ratio of annatto to caramel solids weight ratio ranges from about 1:1 to about 2:1 and for best results in terms of desired color of about 1.5:1.

It is essential that the annatto-caramel blend should have a pH ranging from about 9.1 to about 10.0, preferably about 9.3 to 9.7. However, in the event that the pH of the blend is not initially upon blending within the essential range, then the pH can be adjusted by addition of suitable amounts of acids or bases. For example, if the pH is too high, the pH can be adjusted to desired values within the essential range by addition of a strong, edible mineral acid, e.g., phosphoric acid. Conversely, if the pH is too low, the pH can be adjusted upwards by addition of potassium hydroxide, typically in a one molar to a 0.1 molar solution.

The functional power is measured by the absorbance of the annatto-caramel blend using a standard ultra violet (UV) visable, i.e., a "UV-VIS," specto photometer. ("VIS" indicates that the visable spectrum is also able to be measured.) The absorbance is measured at the 200 and 450 nanometer ("nm") wave lengths. Especially preferred for use herein is an annatto-caramel colorant blend having an absorbance measured at the 200 and 450 nm wave length of an absorbance ratio of about 1.0:1.0 to about 1.5:1.0 annatto to caramel, preferably about 1.25:1.0.

In its blended form, the annatto-caramel colorant blend is useful in a wide variety of food coloring application to provide a desirable reddish brown colorant. The colorant finds particular suitability for use in connection with the addition of color for grain-based products to provide color hues reminiscent of toasting. For example, the colorant is found to be particularly suitable for use to provide the peripheral color feature for the RTE cereal described in U.S. Ser. No. 29/065,077, filed Jan. 21, 1997 entitled "Food Product." The peripheral border feature is intended to be reminiscent of the peripheral brown crust feature of French toast.

It has been found, however, that the pH of the annatto-caramel colorant blend will tend to drift downward over time to a more acidic value. As the pH lowers, the tendency of the annatto to precipitate out increases. It has been found, however, that the pH drift and the resultant rate of annatto precipitate formation can be reduced by refrigeration to temperatures of 0 to 10° C., preferably 2 to 7° C. When stored under refrigerated conditions, the annatto-caramel solution can exhibit a useful shelf life in terms of acceptable levels of precipitation formed of up to three months. However, after extended storage times, especially at higher temperatures, it may be desirable to subject the annatto-caramel colorant blend to a filtration step prior to utilization in order to remove small amounts of precipitant formed during storage so as to insure that the initial sedimentation value is <0.5%.

Surprisingly, however, the tendency to form a precipitate can be used to advantage in certain food applications. For example, in the provision of a colorant feature for RTE cereals, it has surprisingly been found advantageous that the annatto-caramel causes the precipitation of the annatto. The precise mechanism or use for the precipitation of the annatto when applied to the cereal is unknown. The mechanism may be related to heat processing, pH drop, trace element interaction or combination of such or other factors. Regardless of the particular mechanism, the observed result is that the annatto is relatively strongly affixed to the cereal foodstuff. As a result, when milk is added to the RTE cereal having been colored by the annatto-caramel blend, the precipitation or strong binding of the annatto to the foodstuff desirably results in minimization of bleeding off of the colorant into the milk. In contrast, golden brown colorant prepared from certain highly soluble colorants from synthetic materials will tend to bleed from the RTE cereal into the milk resulting in undesirable discoloration of the milk.

METHOD OF PREPARATION

In its method aspect, the present invention resides in methods for preparing a neutral pH, low ammonia content caramel colorant useful as an intermediate in the preparation of stable annatto-caramel blended colorants for foodstuffs. In another method aspect, the present invention resides in methods for preparing such stable neutral pH annatto-caramel colorant blends employing the novel treated caramel colorant constituent herein.

The starting material for the present methods is a conventional caramel colorant. Typically, such colorants will have a pH of around 2.5 to 3.5, a solids concentration of about 45 to 55% and a native or starting ammonia content sometimes provided by an ammonia bisulfite constituent of higher than the maximum desired finished ammonia content of 0.05%. The residual ammonia bisulfide results from the caramel color production process. Typically, the starting ammonia content is about 0.2%. The ammonia bisulfide content can be as high as 1.7%.

The present methods essentially comprise a first step of adding sufficient amounts of an aqueous strong mineral base to the caramel starting material colorant to raise the pH from the initial pH value to a highly alkaline pH value substantially higher than the desired final pH of the finished product to form an alkaline caramel aqueous solution. Specifically, the pH is raised from an initial value ranging from 2.5 to 7 to a desired pH value ranging from about 9 to 10, preferably about 9.7 to 10. As the pH is raised, the caramel colorant will tend to release the ammonia as an off gas. By raising the pH of the caramel to above desired finish pH values, the ammonia off gassing is accelerated.

Useful herein as an aqueous strong mineral base are 0.1 to 1 molar solutions of NaOH, COH, or CaOH.

It has been found especially desirable for use herein to use a potassium hydroxide solution (e.g., 0.1 to 1 M KOH) to alkalinize the caramel. Potassium hydroxide is preferred since the potassium imparts less of a metallic taste than, for example, sodium hydroxide.

The present methods further comprise the essential step of maintaining the alkalized caramel solution at the alkaline pH range for times and conditions sufficient to off gas the ammonia to lower the ammonia content to below the desired threshold ammonia concentrations herein to provide a reduced ammonia content alkaline caramel solution. The ammonia content of the treated alkaline caramel solution is importantly less than 5%, preferably 0.03% or below, and most preferably 0.02% or below.

If desired, the highly alkaline caramel colorant can be treated to accelerate the ammonia release to speed the obtaining of the low ammonia alkaline intermediate caramel product. In this variation, the maintaining step can include, for example, heating the highly alkaline caramel colorant to above room temperatures, preferably about 45 to 100° C. to accelerate the ammonia release. After the desirably low ammonia endpoint concentration is obtained, the caramel color solution can be cooled to room temperature.

Thereafter, the present methods further essentially comprise the step of acidifying the low ammonia, neutral pH caramel colorant by addition with a suitable edible acid, preferably a strong mineral acid, to reduce the pH of the low ammonia caramel colorant to about 6.5 to 7 to form a low ammonia "natural" caramel colorant. The low ammonia, approximately neutral pH caramel colorant so prepared is useful as an intermediate product in the annatto-caramel colorant blends herein.

As described briefly above, the present processes of forming the annatto-caramel colorant then additionally involve the admixture of the aqueous annatto colorant with the treated low ammonia "neutral" caramel colorant to provide an annatto-caramel colorant blend. When admixed in the weight ratios described above, the resultant blend will have a pH value ranging from about 9 to 10, depending in part upon the particular ratios of alkaline annatto to "neutral" caramel colorant employed.

The blend is then treated as described above with either KOH or a strong mineral acid to adjust the pH of the annatto-caramel colorant blend to desired values within the essential pH range of 9.1 to 10.0.

Surprisingly, it has been found that if the pH is below 9.1, then the annatto will tend to precipitate out much more quickly even at refrigerated temperatures. Moreover, when the pH is above 10, then the annatto-caramel blend could cause flavor problems in the food material being colored.

Preferably, the annatto-caramel solution is filtered to remove initial residual particulates to provide an initial sedimentation value of <0.5%.

An advantage of the present process is that the "neutral" caramel colorant by virtue of its pH value is a relatively safe product to handle in commercial plant operations in contrast to the more acidic caramel colorants which typically have a more acidic pH value of about 3. Moreover, by adjusting the pH of the caramel to a more neutral pH, addition of the potassium hydroxide to the already alkaline annatto colorant needed to raise the pH of the blend to 9.3 to 10.0 can be avoided. Were the already alkaline annatto admixed with sufficient amounts of potassium hydroxide so as to provide the blend with the desired end pH, the annatto-potassium hydroxide blend would be a highly alkaline and caustic material to handle.

Another advantage is that the color blends are free of added gelatin which can facilitate receiving a Kosher designation.

What is claimed is:

1. A ready-to-eat cereal piece comprising:
a body having an outer surface; and
a topical coating constituted by an annatto-caramel food colorant arranged on a portion of the outer surface of the body, said annatto-caramel food colorant including a first colorant including an aqueous solution of water soluble annatto having a pH ranging from about 12.5 to 13.5 and a total solids content of about 14% to 18%; and a second colorant including an aqueous caramel solution having a solids content of about 35% to 55%, a pH of about 6.5 to 6.9, and an ammonia content, with the ammonia content being less than 0.05%, said topical coating binding to the outer surface of the body to minimize bleeding off of the colorant when the cereal piece is placed in milk.

2. The ready-to-eat cereal piece according to claim 1, wherein a weight ratio of the first colorant to one part the second colorant ranges from about one part of first colorant to one part second colorant to about four parts first colorant to one part second colorant (1:1–4:1).

3. The ready-to-eat cereal piece according to claim 2, wherein the annatto-caramel food colorant has a pH of about 9.1 to 10.

4. The ready-to-eat cereal piece according to claim 3, wherein the annatto-caramel food colorant has a pH of about 9.5 to 9.7.

5. The ready-to-eat cereal piece according to claim 4, wherein the ammonia content is less than 0.03%.

6. The ready-to-eat cereal piece according to claim 3, wherein the topical coating has an initial sedimentation value of <0.5%.

7. The ready-to-eat cereal piece according to claim 3, wherein the annatto-caramel food colorant has an annatto absorbance to caramel absorbance of 1.0:1.0 to 1.5:1.0 measured at 200 and 450 mm wave lengths.

8. The ready-to-eat cereal piece according to claim 7, wherein the annatto-caramel food colorant has an annatto absorbance to caramel absorbance of 1.25:1.0 to 1.5:1.0 measured at 200 and 450 mm wave lengths.

* * * * *